United States Patent [19]

Ojima

[11] Patent Number: 4,976,661
[45] Date of Patent: Dec. 11, 1990

[54] BELT OR CHAIN TENSIONER FOR POWER TRANSMITTING SYSTEM

[75] Inventor: Juji Ojima, Aikawa, Japan
[73] Assignee: NHK Spring Co., Ltd., Yokohama, Japan
[21] Appl. No.: 396,029
[22] Filed: Aug. 21, 1989
[51] Int. Cl.⁵ ............................................. F16H 7/12
[52] U.S. Cl. .................................................. 474/138
[58] Field of Search ...................... 474/101, 109–111, 474/113–117, 136, 138, 133, 135; 264/286, 289, 147, 168

[56] References Cited

U.S. PATENT DOCUMENTS

| | | | |
|---|---|---|---|
| 4,533,341 | 8/1985 | Yokota | 474/136 X |
| 4,790,801 | 12/1988 | Schmidt et al. | 474/138 X |
| 4,826,470 | 5/1989 | Breon et al. | 474/138 X |
| 4,863,417 | 9/1989 | Kimata et al. | 474/138 X |

FOREIGN PATENT DOCUMENTS 62-13257 1/1987 Japan .
62-185958 11/1987 Japan .

Primary Examiner—Thuy M. Bui
Attorney, Agent, or Firm—Fleit, Jacobson, Cohn, Price, Holman & Stern

[57] ABSTRACT

An advancement and the advancing state of a tension rod which maintains a belt or a chain in a tension state is maintained by a coil spring. The coil spring deflects against an excess of opposite force from the belt or the chain to go back the tension rod and prevents the excess tension of the belt or the chain.

The coil spring having a non-linear characteristic attached within the casing so as to be a range of the use including a changing point of a load deflection characteristic changes the number of active turns of the coil spring at the time of the resonance of the belt or the chain with changing point as the boarder.

The above resonance decreases according to the change of the natural frequency of the vibration of the coil spring.

The advancement of the tension rod can also be performed by the coil spring formed by the stranded wires.

8 Claims, 6 Drawing Sheets

FIG. 1 (a)
FIG. 1 (b)
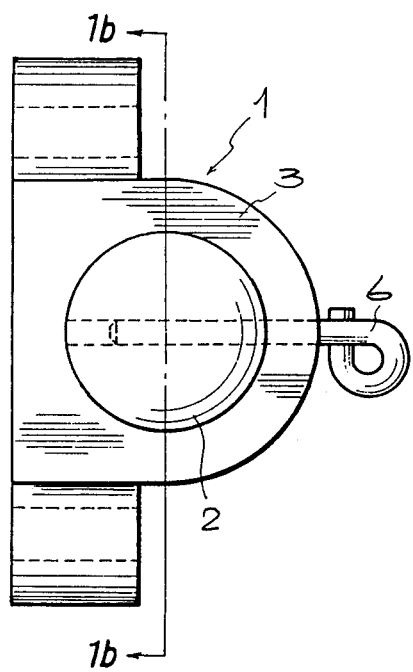
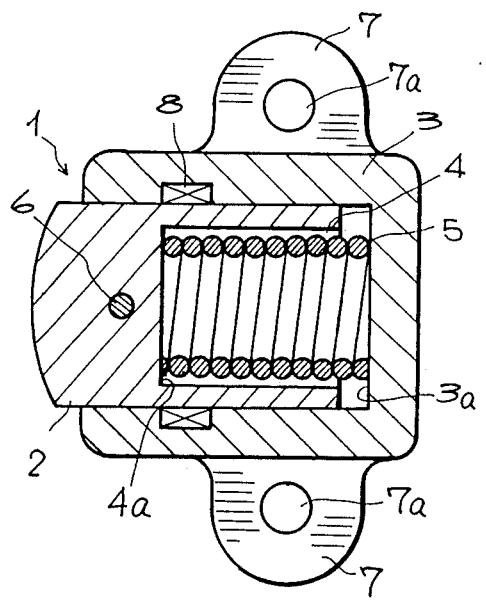

FIG. 8 (a)
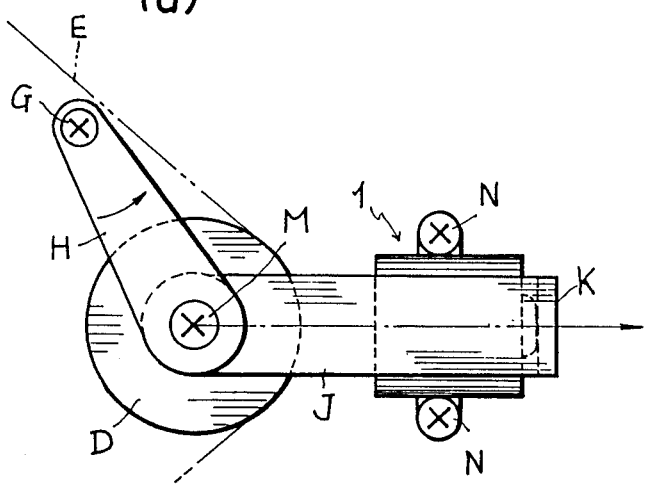
FIG. 8 (b)
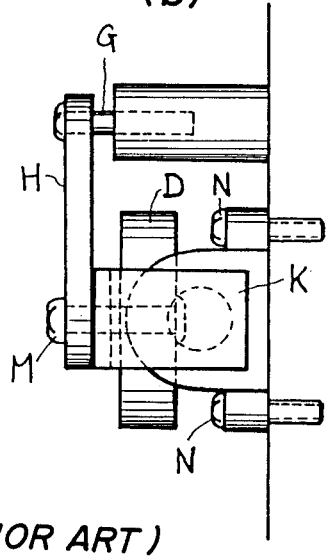
FIG. 9 (PRIOR ART)
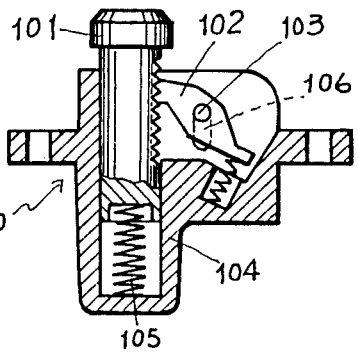
FIG. 10 (PRIOR ART)

BELT OR CHAIN TENSIONER FOR POWER TRANSMITTING SYSTEM

BACKGROUND OF THE INVENTION

This invention relates to a tensioner which maintains a belt or a chain in a suitable tension state by advancement of a tension rod.

PRIOR ART

In view of that such kind of tensioner occurs a noise or a remarkable deterioration of the belt or the chain due to an excess of tension when tension rod advances too much lo return a normal state by the oscillation of the belt or &he chain due to the change of a driving torque or the like, is developed a tensioner 100 which provides return characteristics to the tension rod (Laid open UM. No. 62 (1987)-13257).

The tensioner 100 is installed within a tension case 104 wherein a tension rod 101 which urges the chain can advance as shown in FIG. 1, and further a rachet pawl 102 is adapted to screw with one side of the tension rod 1 and a supporting rod 103 of the rachet pawl 102 is inserted through a long hole 106 of a tension case 104 to be able to change a pawl position of the rachet pawl 102 by the rotation thereof. The tensioner 100 is ordinally keeps the chain in a suitable tension by the advancement of the tension rod 101 when the chain slackens. However, the return direction of the tension rod 101 is regulated by the rachet pawl 102. On the other hand., when the tension rod advances too much and the chain tensioned strongly, the supporting rod 103 of the rachet pawl 102 retreats within a range of the long hole 106 thereby being able to prevent an excess of tension.

Further, a tensioner wherein a return characteristics is given to a tension pulley abuts against a belt is also developed (U.M. laid open No. 62 (1987)-185958).

The tensioner 200 is adapted to provide a suitable tension to a timing belt by urging the timing belt with an aid of a torsion spring 202 by abutment of the tension pulley 201 against the timing belt (not shown) as shown in FIG. 10. Further, along with mounting an cylindrical arm attaching member 204 which supports the tension pulley 201 rotatively to the tensioner through an arm 203, bushes 205, 206 made of resins are mounted to tensioner so as to put the attaching member 204.

According to this tensioner 200, even if the returning spring 202 resonates to the rattling of the timing belt together with being able to prevent an excess tensioning of the belt by providing the return characteristics to the tension pulley 201, said resonation can be restrained by friction forces between bushes 205 and 206 and the arm attaching members.

However, since in the tensioner 100 an returning amount of the tension rod 101 is regulated by the long hole 106, the returning amount of the tension rod 101 caused by an excess advancement according to the resonation of the belt or the chain decreases by the amount thereof. Accordingly, this method has such a problem wherein at least the supporting rod 103 of the rachet pawl abuts against the lower end of the long hole 106 where is the max. return point of the long hole 106, whereby the tension rod 101 becomes a solid body against an opposite force from the belt or the chain to lose a preventive function for the excess tensioning to the belt or the like and a problem wherein since there exists no absorbent of the resonation when the belt or the chain resonates, the prevention of the rattling of the chain or the like is impossible.

Further, in tensioner 200, since the torsion spring 202, the arm attaching member 204, and the bushes 205, 206 form a mulli construction, the device is complicated and becomes large whereby the attaching space is limited. Further, when the friction between the arm attaching member 204 and bushes 205, 206 are allowed to be large, the response to the tension pulley decreases, which makes difficult to control so as to obtain a necessary friction. Furthermore, the damping effect of the resonation decreases due to the abrasion of bushes 205, 206, which occurs the lack of reliability. The tensioner 200 has such problems.

BRIEF DESCRIPTION OF THE INVENTION

This invention is performed in view of such circumstances. The object of this invention is to provide a simple and compact tensioner which is possible to reply to slackness the belt or the chain swiftly and to decrease the resonance of the belt or the like to prevent the overtension.

In order to attain the above object, this invention is characterized in that in the tensioner which maintains a belt or a chain in a suitable tension state by advancement of the tension rod, said advancement and maintenance of the advancing state of the tension rod is performed by a coil spring having a non-linear characteristics attached within a tension case so that a changing point of a load deflection curve i.e., a point of deflection between two adjacent regions of the curve where the curve changes direction may be included within the range of use.

Further, this invention is characterized in that in the tensioner which maintains the belt or the chain in a suitable tension state by advancement of the tension rod, the maintenance of the advancement and the advancing state is performed by a coil spring formed by stranded wires.

Although a coil spring formed by a single or stranded wires can be used for the above unequal pitch coil spring, the coil spring formed by the above stranded wires can be used lo the equal or unequal pitch coil.

In this invention, since the maintenance of the advancement and advancing state of the tension rod which maintains the belt or the chain in a tension state is performed by a coil spring, the coil spring deflects against an excess and opposite force from the belt or the chain and the tension rod goes back to prevent an excess of tension of the belt or the chain.

Further, the coil spring having a non-linear characteristics attached within the tensioner case so that the range of use may include the changing point of the load deflection characteristics therein, changes active turns of the coils spring with the changing point as the border at the time of resonance, said change of the active turns of the coil spring being adapted to damp the resonance due to the change of natural frequency of vibration of the coil spring.

The coil spring formed by stranded wires operates to damp the above frequency by the friction occurs between element wires which constitutes the coil spring by deflection in case of resonance of the chain or the belt.

BRIEF DESCRIPTION OF THE DRAWINGS

FIG. 1(a) and (b) are an elevation view of the tensioner according to this invention and a sectional view taken along the line thereof respectively.

FIG. 8 shows another using state of the tensioner of this invention, wherein (a) is an elevation view and (b) is a side view thereof.

FIG. 9 and FIG. 10 are a sectional view of the conventional tensioner respectively.

DETAILED DESCRIPTION OF THE INVENTION

Figure 2:
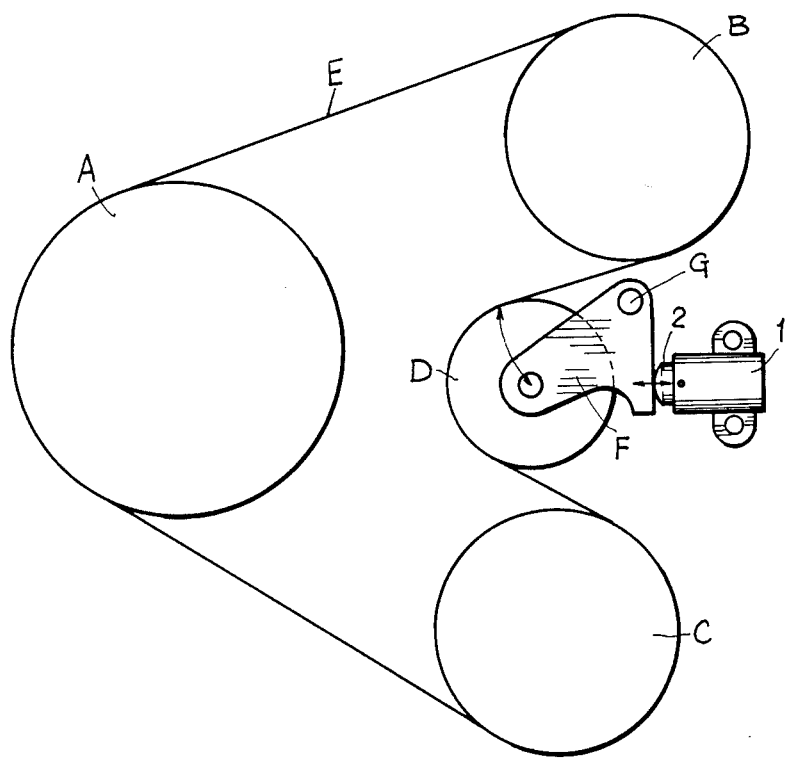
FIG. 2 is an using state view which shows an example of the use the above tensioner.

This invention will be now described with reference to an illustrated example as follows.

FIG. 1 is an elevation view of a tensioner 1 (FIG. 1(a)) and a side sectional view (FIG. 1(b)) according to this invention.

Into the tensioner 1 is inserted a tension rod 2 within a cylindrical casing 3 having a bottom so as to advance or go back. In the tension rod 2, is installed a coil spring 5 which abuts one end thereof against a hole bottom 4a of a penetrated hole 4 having an opening opposite to the bottom 3a of the casing 3 and having a section of a letter "]" shape and further abuts another end thereof against the bottom portion 3a of the casing. The tension rod 2 is installed within the casing without falling off from the casing 3 regardless of the energized force of the coil spring 5 by aid of stopper 6 which penetrates through the casing 3 and tension rod 2.

The numeral 7 in FIG. 1(b) is an attaching fixes the tensioner 1 projectively formed from both sides of the casing 3 to a fixed member suitably, said attaching piece 7 being bored an attaching hole 7a.

The numeral 8 in FIG. 1(b) is an O ring engaged in a circular groove of a cylindrical inner wall of the casing 3, said O ring intending the sealing at the contact portion of the tension rod 2.

The tensioner 1 is, as shown in FIG. 2, used for maintaining and disposing an endless belt E bridged by way of three pulleys A, B and C mounted at fixed positions in a suitable tension state. The belt E is adapted to be provided a suitable tension by urged pressure from a tension pulley D, the urged pressure of the tension pulley D being performed by the tensioner 1. In other words, the tension pulley D is attached so as to move rockably around a fixed rod G through an arm F, said arm F being adapted to urge the tension pulley D to the belt E by being allowed to abut the top end of the tension rod 2 which advance by the energized force of the tension rod 2.

Figure 3A:
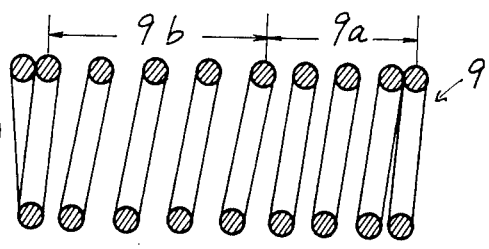
FIG. 3 is a vertical sectional view of unequal pitch coil spring used for the same tensioner, wherein (a) is a free state view, (b) is an assembling view, (c) is a set state view, and (d) is a somewhat extended state view from the setting time thereof.

As a coil spring 5, a coil spring having a non-linear characteristics, or a coil spring formed by stranded wires is used. First, a case wherein the coil spring having a non-linear characteristics is used, will be described. As a coil spring having a non-linear characteristics of this invention, the coil spring shown in FIG. 3(a) is used. This coil spring is an unequal pitch coil spring 9 having two step pitches wherein one end side portion 9a is formed to be a small pitch and another end side portion 9b is formed to be a large pitch with an approximately central portion in a length direction of the coil spring as the border.

Figure 3B:
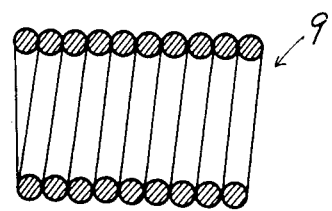
Figure 3C:
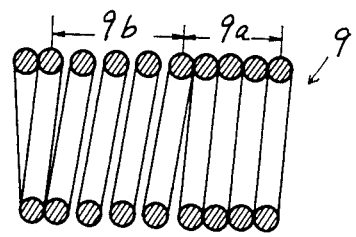
Figure 3D:
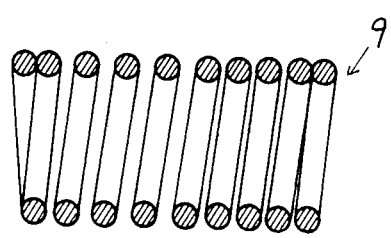

The tensioner 1 used for this unequal pitch coil spring 9 is installed within the casing 1 in a closely secured state between a whole coil (FIG. 3(b)) and assembled rocking the advancement of the tension rod 2 with a stopper 6 (FIG. 1(b)). The tensioner 1 thus assembled is fixed to a certain position through an attaching hole 7a and the sliding rock is removed by removing the stopper 6 whereby the top end of the tension rod is allowed to abut against the arm F of the tension pulley to set it (FIG. 2). The state of the unequal pitch coil spring 9 at the time of setting is, as shown in FIG. 3(c), that the small pitch portion 9a is in a closely contact state and the large pitch portion 9b is in a pitch winding state wherein the distance between coils is separated. The contact state between coils in the above small pitch portion 9a is maintained to a contact state wherein a distance between coils can be transferred to a separated state according to a slight deflection of the belt E as shown in FIG. 3(d).

Figure 4:
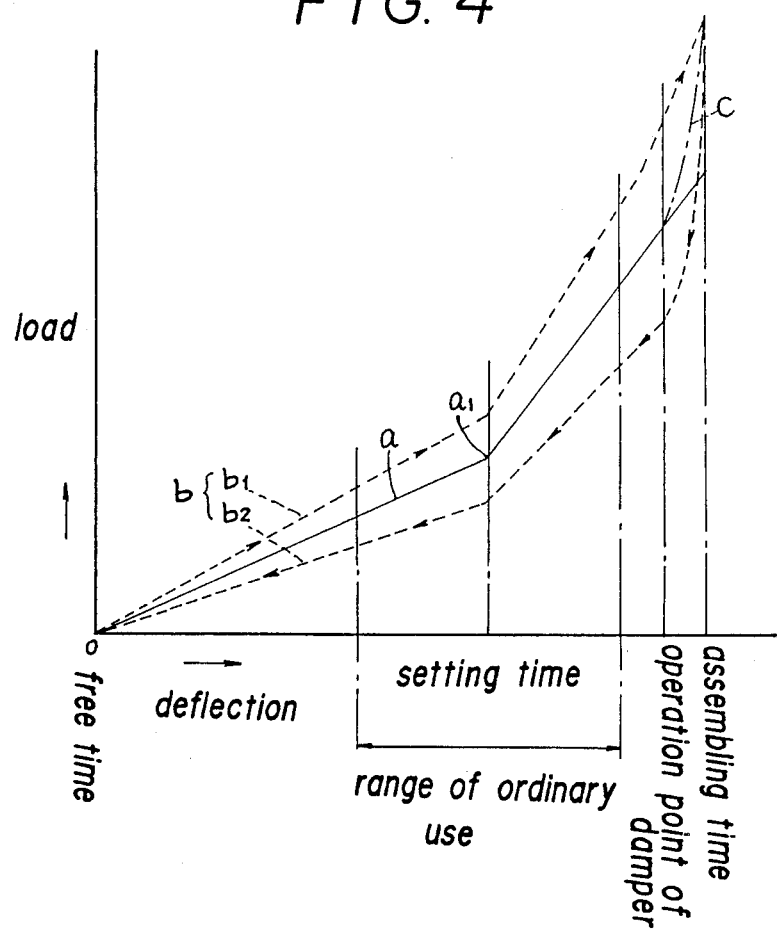
FIG. 4 is a load slacken characteristics diagram.

When this state is shown by the load deflection characteristic diagram of the unequal pitch coil spring 9, this becomes a real line in FIG. 4. The unequal pitch coil spring 9 is set near the changing point a, in the load deflection characteristic diagram i.e., a point between adjacent regions of the curve where the curve changes direction and acts so that a suitable breadth on both sides thereof may be a range of normal use.

In other words, the unequal pitch coil spring 9 is attached within a casing so that the range of the use thereof may be one which include the changing point a of the load deflection characteristics of said spring.

By attaching the unequal pitch coil spring 9 as such, the tension rod 2 is provided a return characteristics which goes back within the casing 3 accompanying the deflection of the coil spring against an excess of opposite force from belt E without transforming a solid body, thereby being able to prevent an excess tensioning of the belt E. Further, in case of resonance of belt E, the unequal pitch coil spring 9 changes the number of active coils with the changing point a, of the load deflection characteristics as the border and the inherent number of vibration also changes according to this change to damp the above resonance.

The tensioners 1 which use this unequal pitch coil spring 9 are considered the following various kinds of modified embodiments.

Figure 5:
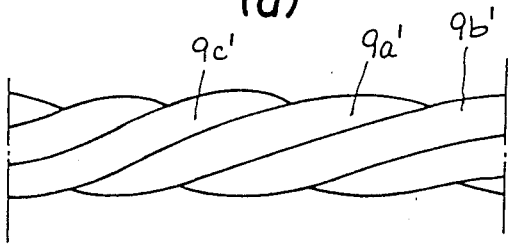
FIG. 5 shows twisted line materials which constitutes the above unequal pitch coil, wherein (a) is a partially side view, and (b) is a sectional view thereof.
Figure 5:
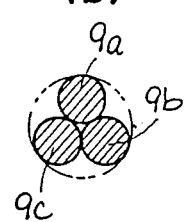

The unequal pitch coil spring 9 may be formed with stranded wires. This unequal pitch coil spring 9 is formed by coiling the wire rods made by twisting three element wires 9'a, 9'b, 9'c as shown in FIG. 5.

When such unequal pitch coil spring 9 made of twisted, wires is used, friction occurs between element wires 9'a, 9'b and 9'c, said characteristics being a broken line b in FIG. 4 in which the friction force is provided to the spring force. This characteristic becomes a large hysteresis having a going characteristics b, and a return one $b_2$, and damps the resonance of belt E effectively together with change of the natural frequency of the unequal pitch coil spring itself.

Further, the resonance energy of the belt E may be adapted to absorb by aid of a shearing resistance by sealing a viscous grease between tension rod 2 and the inner wall of the casing 3 or applying on the unequal pitch coil consisting of the above stranded wires to provide a shearing resistance of the viscous grease to the coil spring at the time of sliding of tension rod 2 or when the slip occurs between the stranded wires $9'a$, $9'b$, and $9'c$.

Figure 6:
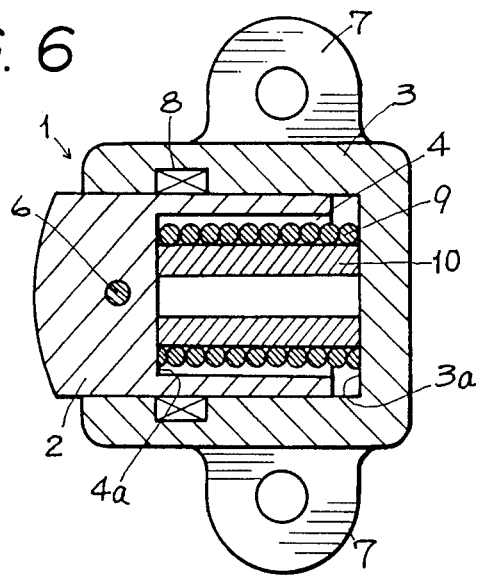
FIG. 6 is a sectional view which shows a modified example of the above tensioner.

Further, the tensioner 1 may, as shown in FIG. 6, be provided with a damper member 10 at the inner side of the unequal pitch coil spring 9. The damper member 10 is provided so as to not to feel to abut the bottom, said damper member 10 being mounted opposing the top end thereof to a hole bottom 4a of the tension rod 2 and abutting the rear end thereof against the bottom 3a of the casing 3. The damper effect can be obtained by abutting the top end of the tension rod 2 against the hole bottom 4a of the tension rod 2 before the whole coil of the coil spring 9 becomes a closely contact state near the return end point of the tension rod 2.

The characteristics of the tension rod 2 at this time are shown by a dot-and-dash line c in FIG. 4.

In order to obtain such damper effect, a cylindrical body made of an elastic member such as rubber or the like, or coil spring is used as a damper member 10. Although the coil spring may be one formed by a stranded wires, when an unequal pitch coil spring 9 made of stranded wires is used, a winding direction may be different from a stranded direction (for instance, one is a S stranded, while another is a Z stranded) so that both element wires are not engaged with. When the damper member 10 displays the damper effect, this damper expands outwards to contact with the unequal pith coil 9, thereby causing the friction to be able to make the damper effect larger. This damper effect seals the sliding surface of the tension 2 by the O ring 8 engaged with wall of the inner circumference of the casing 3 to close contactly the casing 3 as shown in FIG. 1 and FIG. 6, thereby being able to display a damper effect larger by addition of the air-damper action.

Then, a case wherein the coil spring formed by the stranded wires as shown in FIG. 1 is used as a coil spring 5 of the tensioner 1, will be described.

Since this coil spring is to decrease the resonance of belt E with friction energy between the element wires which form the stranded wires as shown in the unequal pitch coil spring 9 formed by the stranded wire described above, it is not necessary to form to be unequal pitch, but may be an equal pitch coil.

Figure 7:
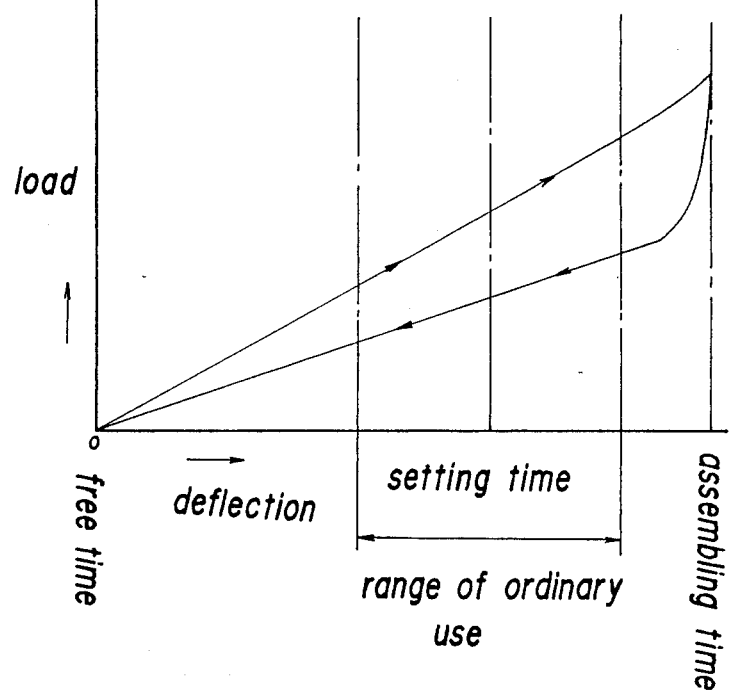
FIG. 7 is a load slacken characteristics diagram of equal pitch coil spring of the stranded wires used for the above tensioner.

This stranded equal pitch coil spring is attached within the casing 3 in a closely contact state as same as in the above unequal pitch coil to assemble the tensioner 1. This tensioner is set by abutting the top end of the tension rod 2 against an arm F of a tension pulley removing the stopper 6 after fixing the tension at a certain position. If this setting state is illustrated by a load deflection characteristic diagram, it is shown by FIG. 7. Namely, the setting state is positioned approximately at an intermediate portion of the deflection of the coil spring, and an arbitrary deflection breadth with a center of the setting state is a range of a normal use. Accordingly, the tensioner 1 which uses stranded wires having an equal pitch coil spring also posses a sufficient ret urn characteristics and the resonance of belt E can be decreased effectively by the friction occurs between element wires.

The same modified embodiment is also applied to the tensioner 1 which uses the stranded equal pitch coil spring as same as in he unequal pitch coil spring 9 described above and can be obtained the same operating effect.

Further, this invention includes the following various kinds of modified embodiments.

Of course, the coil spring having a non-linear characteristic is not defined to the unequal pitch coil spring 9 described above, but includes an unequal pitch coil spring more than three steps. Further, it also includes such coil spring which is adapted to have non-linear characteristic by other means such as making a difference of a diameter of the coil or of an element wire which forms the coil between pitches.

Further, a method of use of the tensioner is not to urge the belt E with tension rod through the tension pulley D as shown in FIG. 2, but may pull the belt E with tension rod. The use of this case is shown in FIG. 8, (a) and (b).

In FIG. 8, the tension pulley D and the tensioner 1 are provided so as to position at the inner side of the belt E and at the outer side of the tension pulley respectively. The tension pulley D is attached swingably to one end of an arm H which is rotatively supported another end thereof by a fixed rod G so that it may be moved around the fixed rod G.

On the other hand, the tensioner 1 is provided so that the top end of the tension rod 2 may be positioned at the opposite side of the tension pulley D. The tension pulley D is connected with tensioner 1 by aid of a connecting member J. The connecting member J forms a connecting piece K by bending an end of an approximately rectangular plate to a right angle. The tension pulley D is connected with tensioner 1 by being allowed to abut the top end of the tension rod 2 against the inner side of the connecting piece K and by supporting the another end of the opposite side of the connecting piece K to the supporting rod M of the tension pulley D.

When the tensioner 1 is used as such, the tension pulley D is pulled in a direction shown by an arrow through the connecting member J by the advancement of the tension rod and the belt E is maintained at a suitable pulling state by a pulling force at this time.

Since this invention is constituted as described above, this invention has following effects:

(1) Since the advancement and the maintenance of the advancing state of the tension rod are performed by the coil spring, a sufficient return characteristics is provided to prevent an excess of tension of the belt or the chain, thereby being able to maintain a suitable tension state.

(2) Since the stranded wire coil spring or a coil spring having non-linear characteristic attached so that a range of the use may include the changing point of the load deflection characteristics therein is used as a coil spring, the resonance of the belt or the chain decrease effectively according to the friction of the coil spring itself or to the change of the natural frequency of vibration thereof whereby the belt or the like can be operated smoothly.

(3) Since the maintenance of a suitable tension state of the belt and the prevention of the resonance are performed by a coil spring used for energizing means to the tension rod, there is no necessary for such means as other return characteristic providing means and the prevention of the resonance.

These are performed only by energizing construction of the tension rod and an assembling construction is also simple. Further, a whole construction becomes compact and is no need of the selection of the space.

What I claim is:

1. In a spring tensioner device for applying tensioning pressure to an endless drive element, such as a belt or chain, the device comprising a piston and cylinder assembly which includes a coil spring within the cylinder for applying outward pressure on the piston, the improvement wherein the spring has a load to deflection curve with a deflection point between two adjacent regions of the curve at which point the curve changes direction and wherein the assembly is configured for setting the spring at a position wherein said deflection point is within an operating range of the device.

2. The improvement of claim 1, wherein the spring comprises adjacent section which are respectfully of different pitch.

3. The improvement of claim 1, wherein the spring is made of stranded wires.

4. In a spring tensioner device for applying tensioning pressure to an endless drive element, such as a belt or chain, the device comprising a piston cylinder assembly which includes a coil spring within the cylinder for applying outward pressure on the piston, the improvement wherein the spring comprises adjacent sections which are respectively of different pitch.

5. The improvement of claim 4 wherein the spring is formed of stranded wires.

6. In a spring tensioner device for applying tensioning pressure to an endless drive element, such as a belt or chain, the device comprising a piston and cylinder assembly which includes a coil spring within the cylinder for applying outward pressure on the piston, the improvement within the spring is formed of stranded wires.

7. The improvement of claim 6 wherein the spring has adjacent sections which are respectfully of different pitch.

8. The improvement of claim 6 wherein the assembly includes a resilient damper bushing coaxial with the spring.

* * * * *